United States Patent [19]
Jang

[11] Patent Number: 5,095,496
[45] Date of Patent: Mar. 10, 1992

[54] DIGITAL AUDIO SIGNAL RECEIVER

[75] Inventor: Seong-Chul Jang, Suwon, Rep. of Korea

[73] Assignee: SamSung Electronics Co., Ltd., Suwon, Rep. of Korea

[21] Appl. No.: 616,086

[22] Filed: Nov. 20, 1990

[30] Foreign Application Priority Data

Nov. 21, 1989 [KR] Rep. of Korea ............... 1989-17179

[51] Int. Cl.$^5$ ............................................ H04B 14/04
[52] U.S. Cl. ........................................ 375/25; 375/76; 307/362
[58] Field of Search .................... 375/25, 76, 99; 328/146, 147, 165; 307/350, 356, 360, 362, 359, 358

[56] References Cited

U.S. PATENT DOCUMENTS

| | | | |
|---|---|---|---|
| 4,307,465 | 12/1981 | Gieller | 375/76 |
| 4,469,082 | 9/1984 | Nishitoba et al. | 307/359 |
| 4,516,247 | 5/1985 | Carsalade et al. | 307/356 |
| 4,701,715 | 10/1987 | Amazawa et al. | 328/165 |
| 4,873,702 | 10/1989 | Chiu | 375/76 |
| 4,910,753 | 3/1990 | Wakatsuki et al. | 307/358 |

Primary Examiner—Stephen Chin
Attorney, Agent, or Firm—Robert E. Bushnell

[57] ABSTRACT

There is disclosed a digital audio signal reciever for preventing the generation of modulation noise in a D/A converted analog signal by eliminating Jitter effect occurring during transmission of digital audio data beforehand. The digital audio signal receiver includes an input selection circuit for selecting one of external digital audio signal soures, a first waveform shaping circuit for removing noise components of digital audio signals selected by the input selection circuit and shaping waveforms thereof, a first low pass filter for integrating the shaped waveform generated from the first waveform shaping circuit and adjusting the duty rate thereof, a second waveform shaping circuit for removing a DC noise component of the output waveform with duty rate adjusted by the first low pass filter and shaping the waveform thereof, a second low pass filter for monitoring duty rate of the output waveform of the second waveform shaping circuit to be at 50%, a comparator for providing feedback to the input terminal of the second waveform shaping circuit by comparing the output waveform of the second low pass filter with a reference voltage, and a demodulator for demodulating the output waveform of the second waveform shaping circuit back to original PCM audio data.

2 Claims, 2 Drawing Sheets

DIGITAL AUDIO SIGNAL RECEIVER

BACKGROUND OF THE INVENTION

The present invention relates to a digital audio signal receiver in digital audio appliances, and more particularly to a digital audio receiver which receives digital audio signals in accordance with a digital audio interface format (hereinafter referred to as DAI format).

Generally, communications of digital audio signals between home appliances such as digital audio systems are performed in accordance with a protocol of DAI format. In the DAI format, PCM (Pulse Code Modulation) audio signals and control signals are transmitted after being modulated by Bi-Phase Mark modulation. The DAI format includes 24 bits for data, 4 bits for a synchronization signal, and 4 bits for a control signal. Thus, each word is composed of a total of 32 bits and the data is transmitted at a high transmission rate of 5-6 Mega bits/sec.

The transmission signal in the DAI format is restored to original PCM audio data in other digital audio appliances (for example in a digital amplifier) in accordance with DAI format, and after operations of the above digital signal processing, the PCM audio data is then converted into analog signals by a D/A converter.

However, practically due to various factors such as characteristics of the cable employed in transmission, a phenomenon which causes change in phase of the transmitted pulse, called Jitter effect, occurs during the process of transmission and thus causes a drawback of generation of modulation noise in the process of converting the data waveform into an analog signal by a D/A converter.

SUMMARY OF THE INVENTION

It is accordingly an object of this invention to provide a digital audio signal receiver for preventing the generation of modulation noise in a D/A converted analog signal by eliminating Jitter effect occurring during transmission of digital audio data beforehand.

A digital audio signal receiver includes an input selection circuit which selects one of multiple external digital audio signal input sources. A first waveform shaping circuit eliminates noise components of the digital audio signal selected by the input selection circuit and shapes the waveform thereof. A first low pass filter (LPF) adjusts duty rate by integrating the shaped waveform generated by the first waveform shaping circuit and eliminates the DC component from the waveform. Then, a second waveform shaping circuit eliminates the DC noise component of the output waveform whose duty rate has been adjusted by the first low pass filter and shapes the waveform thereof. A second low pass filter monitors the duty rate of the output waveform of the second waveform shaping circuit to be at 50% and a comparator feeds back to input terminal of the second waveform shaping circuit by comparing the output waveform of the second low pass filter with reference voltage (Vref). Thereafter, a demodulator demodulates the output waveform of the second waveform shaping circuit back to a original PCM audio signal.

BRIEF DESCRIPTION OF THE DRAWINGS

For a better understanding of the invention and to show how the same may be carried into effect, reference will now be made, by way of example, to the accompanying diagrammatic drawings, in which.

DETAILED DESCRIPTION OF THE PREFERRED EMBODIMENT

Figure 1:
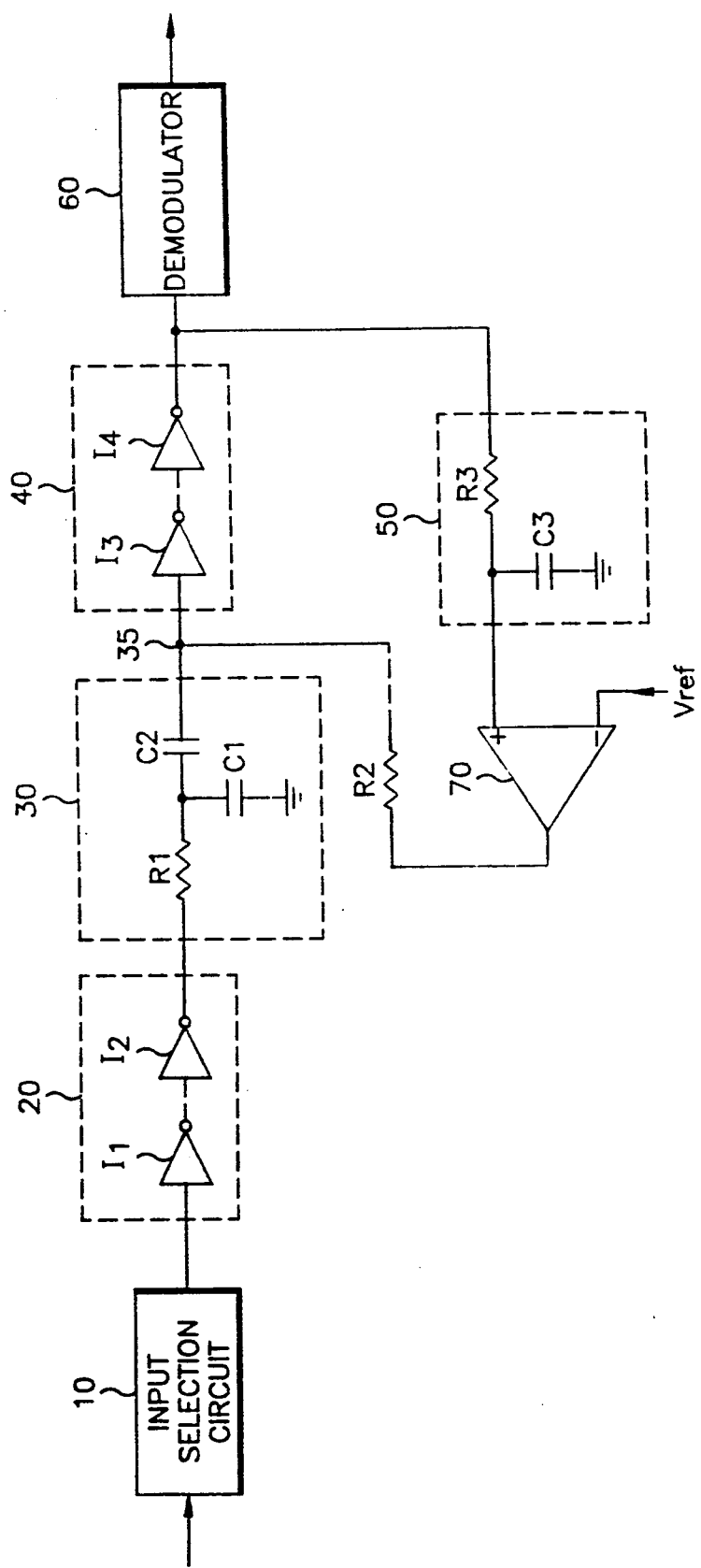
FIG. 1 is a circuit according to the present invention.

Referring to FIG. 1, a digital audio signal receiver includes an input selection circuit 10 which selects one of multiple external digital audio signal input sources. A first waveform shaping circuit 20 eliminates noise components of the digital audio signal selected by the input selection circuit 10 and shapes the waveform thereof. A first LPF 30 adjusts the duty rate by integrating the shaped waveform generated by the first waveform shaping circuit 20 and eliminates the DC component from the waveform. Then, a second waveform shaping circuit 40 eliminates the DC noise component of the output waveform whose duty rate has been adjusted by the first LPF 30 and shapes the waveform thereof. A second LPF 50 monitors the duty rate of the output waveform of the second waveform shaping circuit 40 to be at 50% and a comparator 70 feeds back to the input terminal of the second shaping circuit 40 by comparing the output waveform of the second LPF 50 with reference voltage (Vref). Thereafter, a demodulator 60 demodulates the output waveform of the second waveform shaping circuit 40 back to a original PCM audio signal.

Figures 2A, 2B, 2C, 2D, 2E:
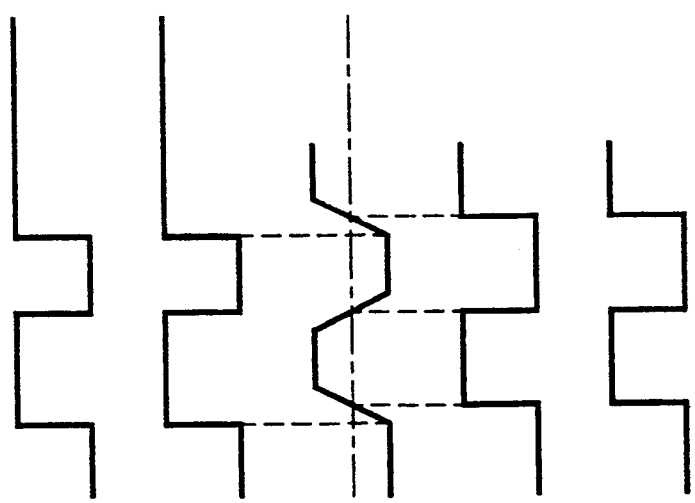
FIGS. 2A to 2E are operational waveforms of FIG. 1.

Referring to FIGS. 2A to 2E, operational waveforms are described in which: FIG. 2A is an output waveform of the input selection circuit 10; FIG. 2B is an output waveform of the first waveform shaping circuit 20; FIG. 2C is a waveform of node 35; FIG. 2D is an output waveform of the second waveform shaping circuit 40; and FIG. 2E is an output waveform of the demodulator 60.

Now, the operation of FIG. 1 will be explained with reference to FIGS. 2A to 2E. When multiple external signal sources in DAI format are applied to the input selection circuit 10, it selects one of the signal sources and generates the waveform as shown in FIG. 2A. The input selection circuit 10 selects the digital audio signal from the input data without changing the input digital audio signals. The external signal transmitted in DAI format, which is the output of the input selection circuit 10, passes through the first waveform shaping circuit 20 having a series of inverters $I_1$ and $I_2$, of which noise is removed along with the shaping of the waveform as shown in FIG. 2B. The shaped waveform which is the output of the first waveform shaping circuit 20 is applied to the first LPF 30 where it is integrated by a resistor R1 and a capacitor C1, and when the DC component is removed by passing through a capacitor C2, it becomes an integrated waveform with a duty rate of 50% as shown in FIG. 2C. That is, since the DC component in Bi-Phase Mark modulated signals is not included, the integrated value of the duty rate is always 50%. The waveform of FIG. 2C becomes the waveform of FIG. 2D with an exact duty rate of 50% and the DC component removed after passing through the second waveform shaping circuit 40 of inverters $I_3$ and $I_4$.

The second LPF 50 monitors the duty rate of the output waveform of the second waveform shaping circuit 40 to be at 50%, and applies the above monitored output waveform to a non-reverse terminal of comparator 70. And the reference voltage (Vref) is applied to an inverting terminal of the comparator 70. Hence, the comparator 70 feeds back to the input terminal of the second waveform shaping circuit 40 by comparing the output waveform of the second LPF 50 with the reference voltage (Vref). When the duty rate of the feedback waveform is higher than 50% with reference to "High" state, the DC component output of comparator 70 decreases because the integrated waveform of the signal that passed through the second waveform shaping circuit 40 and the second LPF 50 decreases. Therefore, the threshold level at node 35 which is the decision boundary for logic "1" and "0" of the node 35 increases. But when duty rate is lower than 50%, the threshold level of node 35 decreases. If the reference voltage is set to the same value of the integrated output signal value with a duty rate of 50%, the output waveform of the second waveform shaping circuit 40 is maintained at duty rate of exactly 50%. That is, the previously mentioned Jitter effect is removed.

The output waveform of the second waveform shaping circuit 40 is applied to the demodulator 60 where it is restored to the original PCM audio data and the output waveform such as shown in FIG. 2E is applied to the internal circuit.

As described in the foregoing, this invention has an advantage of accurately demodulating the DAI format signal back to the original PCM audio data by removing the Jitter effect occurring during its transmission.

While the invention has been particularly shown and described with reference to a preferred embodiment, it will be understood by those skilled in the art that modifications in detail may be made without departing from the spirit and scope of the invention.

What is claimed is:

1. A digital audio circuit for a data audio appliance, comprising:
   an input selection circuit for selecting one digital audio signal from among multiple external digital audio signals;
   a first waveform shaping circuit for removing input noise components of said one digital audio signal selected by said input selection circuit and for providing a first shaped waveform by shaping the waveform of said one digital audio signal;
   a first low pass filter for providing an integrated waveform by integrating said first shaped waveform generated from said first waveform shaping circuit and adjusting the duty rate of said integrated waveform;
   a second waveform shaping circuit for removing direct current noise components of said integrated waveform with duty rate adjusted by said first low pass filter and for providing a second shaped waveform by shaping the waveform of said integrated waveform;
   a second low pass filter for providing an output waveform monitoring the duty rate of said second shaped waveform of said second waveform shaping circuit to be at 50%;
   a comparator for providing feedback to an input terminal of said second waveform shaping circuit by comparing the output waveform of said second low pass filter with a reference voltage; and
   a demodulator for demodulating the second shaped waveform of said second waveform shaping circuit back to pulse code modulated audio data.

2. A digital audio circuit for a data audio appliance, comprising:
   an input selection circuit for selecting one digital audio signal from among multiple external digital audio signals;
   a first waveform shaping circuit for removing input noise components of said one digital audio signal selected by said input selection circuit and for providing a first shaped waveform by shaping the waveform of said one digital audio signal;
   a first low pass filter for providing an integrated waveform by integrating said first shaped waveform generated from said first waveform shaping circuit and adjusting the duty rate of said integrated waveform;
   a second waveform shaping circuit for removing direct current noise components of said integrated waveform with duty rate adjusted by said first low pass filter and for providing a second shaped waveform by shaping the waveform of said integrated waveform;
   a second low pass filter for providing an output waveform monitoring the duty rate of said second shaped waveform of said second waveform shaping circuit;
   a comparator for providing feedback to an input terminal of said second waveform shaping circuit by comparing the output waveform of said second low pass filter with a reference voltage; and
   a demodulator for demodulating the second shaped waveform of said second waveform shaping circuit back to provide pulse code modulated audio data.

* * * * *

UNITED STATES PATENT AND TRADEMARK OFFICE
CERTIFICATE OF CORRECTION

PATENT NO. : 5,095,496
DATED : March 10, 1992
INVENTOR(S) : Seung-Chul Jang It is certified that error appears in the above-identified patent and that said Letters Patent is hereby corrected as shown below:

On the Title page:

Abstract, line 7 (of the actual text), replace "soures" with -- sources--.

Column 1, line 64, replace "a oringinal" with --an original--;

Column 2, line 30, replace "a original" with-- an original--;

Signed and Sealed this

Fourth Day of May, 1993

*Attest:*

MICHAEL K. KIRK

*Attesting Officer*  Acting Commissioner of Patents and Trademarks